Aug. 16, 1932.   W. S. WATTS   1,872,051
BRAKE
Filed July 22, 1929

INVENTOR.
WILLIAM S. WATTS
BY H. O. Clayton
ATTORNEY

Patented Aug. 16, 1932

1,872,051

UNITED STATES PATENT OFFICE

WILLIAM S. WATTS, OF SOUTH BEND, INDIANA, ASSIGNOR TO BENDIX BRAKE COMPANY, OF SOUTH BEND, INDIANA, A CORPORATION OF ILLINOIS

BRAKE

Application filed July 22, 1929. Serial No. 380,111.

This invention relates to operating mechanism and is illustrated as embodied in a novel arm mounted on the cam shaft of a brake structure for an automobile wheel.

An object of the invention is to provide a light but rigid crank arm on the end of a shaft, which arm is capable of ready adjustment with respect to the shaft to compensate for the wear of the brake.

In one desirable arrangement, the novel crank arm is of channel section and is reinforced at its respective ends to provide a bearing structure for the shaft to which it is connected and a novel thrust element. As indicated in one embodiment of my invention, the arm may be fabricated from channel section stock, the base portion of which may be extended at one end to form a tongue return bent to form a bearing for the shaft to which the arm is mounted. At the applying end of the arm one side wall of the channel may be extended across the arm parallel with the base of the channel to provide a bearing within which is journaled the aforementioned thrust element.

The above and other objects and features of the invention, including various novel and desirable details of construction will become apparent from the following description of the embodiments of the invention shown in the accompanying drawing in which.

The novel operating mechanism selected for illustration in Figures 1 to 6, inclusive, includes a brake applying shaft 10 arranged such as to be journaled in a support such as the backing plate 11 of the brake which shaft carries an operating arm 12 at its end and which arm constitutes the essential feature of my invention.

Figure 1:
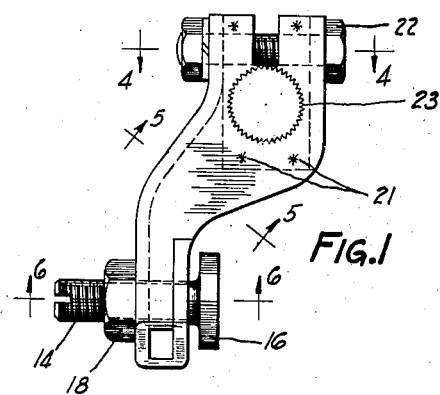
Figure 1 is a side elevation of my novel brake applying arm.
Figure 2:
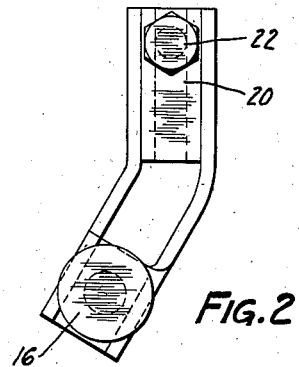
Figure 2 is an end elevation of the arm disclosed in Figure 1.
Figure 4:
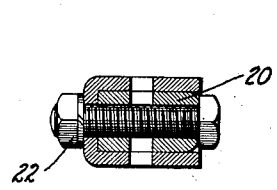
Figure 4 is a transverse section taken on the line 4—4 of Figure 1.
Figure 5:
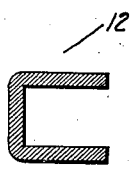
Figure 5 is a transverse section through the arm and its thrust element taken on the line 5—5 of Figure 1.
Figure 6:
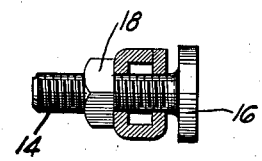
Figure 6 is a sectional view substantially on line 6—6, Figure 1.
Figure 3:
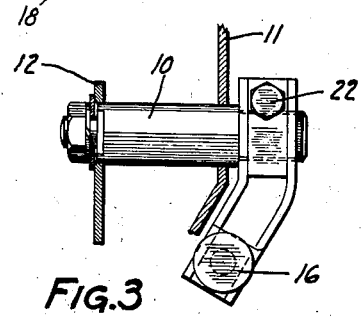
Figure 3 is a partial vertical section through the novel brake applying means showing the brake operating shaft in side elevation.

The novel crank arm is preferably fabricated from a channel sectioned stamping, the lower power applying end of which is curved to one side and outwardly, as indicated in Figures 1 and 2, to space the thrust end conveniently from the axis of the shaft 10. At the aforementioned power applying end of the lever, the same is preferably continued from one of the side walls parallel to the base of the channel and superposed at its end upon the peripheral surface of a cut-away portion of the remaining side wall to thus form a square-sectioned end of the arm serving as a bearing for a thrust element 14 threaded within said end and headed at one of its ends at 16. The thrust element is preferably clamped in its adjusted position in the arm by a nut 18. At its other end, my novel crank arm is preferably reinforced by a channel-sectioned stamping 20 which is telescoped within the channel of the arm, as indicated in Figure 3. This telescoping reinforcing stamping is preferably welded to the side walls of the arm at points 21, as indicated in Figure 1. The material of both the arm and reinforcement may then be slotted, as indicated in Figures 1 and 4, and further recessed to accommodate the brake shaft 10. A binding bolt 22 may be threaded through the projections formed by said slotting, which bolt serves to clamp the arm in its position of adjustment upon the brake shaft. To preserve the angular adjustment of the arm with respect to the shaft, the rounded inner peripheral surface of the arm may be serrated and its counterpart surface on the shaft correspondingly serrated as indicated at 23 in Figure 1.

Figure 7:
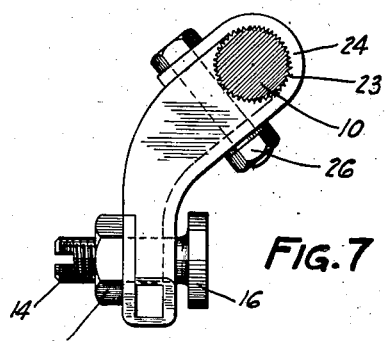
Figure 7 is a view similar to Figure 1 showing in side elevation a modified form of my novel brake applying arm.
Figure 8:
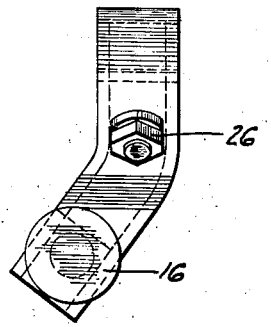
Figure 8 is an end elevation of the arm disclosed in Figure 7.

A modified embodiment of my invention is disclosed in Figures 7 and 8 wherein the base of the channel-sectioned arm may be extended to form a tongue member 24 return bent to surround the brake shaft 10 and forming with the curved recessed side walls of the channel of the arm a bearing for said shaft. Binding means such as a bolt 26 may be extended through the end of the tongue and base of the channel to secure the angular adjustment in a manner similar to the structure disclosed in Figure 1. At its thrust end the crank arm disclosed in the embodiment of Figure 7 is similar to that disclosed in Figure 1.

There is thus provided a very cheap and effective brake operating element, the central portion of which is of channel section contour to withtand the severe bending movement at this point to which this arm is subjected with brake application. The thrust elements 14 are adapted to be contacted by a lever or equivalent operating mechanism of the brake connected by suitable transmission linkage with the service pedal.

While several illustrative embodiments have been described in detail, it is not my intention to limit the scope of the invention to those particular embodiments or otherwise than by the scope of the appended claims.

I claim:

1. Brake applying means comprising, in combination with a shaft, a channel-sectioned stamping constituting a crank arm, one end of which is closed to form a box-sectioned structure and the other end of which is detachably secured to the shaft to angularly adjust the applying means with respect thereto.

2. Operating means comprising, in combination a channel-sectioned stamping constituting crank arm said stamping having at one end thereof one of its side walls extended in parallelism with the base of the channel to form a square-sectioned bearing for a thrust element passing therethrough.

3. A crank arm characterized by a channel-sectioned stamping provided at one of its ends with a U shaped stamping telescoping within said channel and permanently secured thereto to reinforce said end.

4. A crank arm characterized by a channel-sectioned stamping provided at one of its ends with a U shaped stamping telescoping within said channel and permanently secured thereto to reinforce said end, said end parts being slotted to form a bearing surface for a shaft extending therein.

In testimony whereof, I have hereunto signed my name.

WILLIAM S. WATTS.